US012281586B2

(12) United States Patent
Leszczynski et al.

(10) Patent No.: US 12,281,586 B2
(45) **Date of Patent: *Apr. 22, 2025**

(54) VIBRATIONAL DAMPING ASSEMBLY FOR USE IN AN AIRFOIL

(71) Applicant: GE Infrastructure Techology LLC, Greenville, SC (US)

(72) Inventors: Karol Filip Leszczynski, Henrykow Urocze (PL); Przemyslaw Michal Jakubczak, Warsaw (PL)

(73) Assignee: GE Infrastructure Technology LLC, Greenville, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 18/437,562

(22) Filed: Feb. 9, 2024

(65) Prior Publication Data

US 2024/0183285 A1 Jun. 6, 2024

Related U.S. Application Data

(63) Continuation of application No. 17/731,653, filed on Apr. 28, 2022, now Pat. No. 11,933,186.

(30) Foreign Application Priority Data

Mar. 31, 2022 (PL) ........................................ 440813

(51) Int. Cl.
*F01D 25/06* (2006.01)
*F01D 5/16* (2006.01)
*F01D 25/30* (2006.01)

(52) U.S. Cl.
CPC ............... *F01D 25/06* (2013.01); *F01D 5/16* (2013.01); *F01D 25/30* (2013.01);
(Continued)

(58) Field of Classification Search
CPC . F01D 25/04; F01D 25/06; F01D 5/10; F01D 5/16; F01D 5/26; F01D 9/00;
(Continued)

(56) References Cited

U.S. PATENT DOCUMENTS 7,128,536 B2 10/2006 Williams et al.
8,923,282 B2 12/2014 Sampath et al.
(Continued)

FOREIGN PATENT DOCUMENTS

EP 3051076 B1 10/2020

OTHER PUBLICATIONS

Hongrui, A. et al., 'Modeling of micro-friction in a multi-layer metal plate damper for a rotor support system', 2008 2nd International Symposium on Systems and Control in Aerospace and Astronautics, Shenzhen, China, 2008, pp. 1-4, [retrieved Jun. 13, 2024]. doi: 10.1109/ISSCAA.2008.4776322. (Year: 2008).*

*Primary Examiner* — Elton K Wong
(74) *Attorney, Agent, or Firm* — Dority & Manning, P.A.

(57) ABSTRACT

Vibrational damping assemblies, turbomachine airfoils, and exhaust diffusers are provided. A vibrational damping assembly includes at least one pin coupled to the turbomachine component. The at least one pin has a pin body and a disk coupled to the pin body. The vibrational damping assembly further includes at least one plate disposed between the disk and the turbomachine component. The at least one plate is movable between the disk and the turbomachine component relative to the plurality of pins and relative to the turbomachine component to dampen vibrations experienced by the turbomachine component.

19 Claims, 6 Drawing Sheets

(52) U.S. Cl.
CPC ...... *F05D 2230/64* (2013.01); *F05D 2240/12* (2013.01); *F05D 2260/96* (2013.01)

(58) Field of Classification Search
CPC ... F01D 9/02; F01D 9/04; F01D 9/041; F01D 9/042; F05D 2260/96; F05D 2240/12; F05D 2230/64
See application file for complete search history.

(56) References Cited

U.S. PATENT DOCUMENTS

| | | | | |
|---|---|---|---|---|
| 9,957,824 | B2 | 5/2018 | Klinetob et al. | |
| 10,041,359 | B2 | 8/2018 | Brandl et al. | |
| 10,260,372 | B2 | 4/2019 | Klinetob et al. | |
| 10,557,353 | B2 | 2/2020 | Malmborg et al. | |
| 11,933,186 | B2 * | 3/2024 | Leszczynski | F01D 5/26 |
| 2016/0040536 | A1 * | 2/2016 | Collins | F01D 5/22 416/196 R |
| 2016/0084089 | A1 * | 3/2016 | Blaney | B22F 5/04 219/76.12 |
| 2017/0306792 | A1 * | 10/2017 | Fryer | F02C 7/32 |
| 2020/0291815 | A1 | 9/2020 | Malmborg et al. | |
| 2021/0071547 | A1 * | 3/2021 | McGivern | F01D 25/30 |

* cited by examiner

VIBRATIONAL DAMPING ASSEMBLY FOR USE IN AN AIRFOIL

PRIORITY STATEMENT

The present application is a continuation application of U.S. Non-Provisional patent application Ser. No. 17/731,653 having a filing date of Apr. 28, 2022, which claims priority to Polish Patent Application Serial No. P.440813, filed Mar. 31, 2022, which is incorporated by reference herein in its entirety.

FIELD

The present disclosure relates generally to frequency mitigation in airfoils of a turbomachine. Specifically, the present disclosure is related to an apparatus for mitigating frequency oscillations within airfoils of a turbomachine exhaust diffuser.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases are then exhausted from the turbine section through an exhaust diffuser positioned downstream from the turbine section.

The exhaust diffuser typically includes an inner shell and an outer shell that is radially separated from the inner shell to form an exhaust flow passage through the diffuser. One or more generally airfoil shaped diffuser struts extend between the inner and outer shells within the exhaust flow passage to provide structural support to the outer shell and/or to an aft bearing that supports the shaft.

Typical power generating turbomachines are capable of enormous power output, and as such, are often operated at part or partial load to satisfy demand. However, operating at part or partial load can result in frequency oscillations (i.e., pressure pulsations) within the exhaust diffuser that could cause damage to the airfoil shaped diffuser struts over time or result in a shutdown of the turbomachine.

Accordingly, a vibrational damping assembly, that reduces or eliminates mechanical vibrations experienced by the airfoil shaped exhaust diffusers and/or the entire exhaust diffuser, is desired and would be appreciated in the art.

BRIEF DESCRIPTION

Aspects and advantages of the vibrational damping assemblies, turbomachine airfoils, and exhaust diffusers in accordance with the present disclosure will be set forth in part in the following description, or may be obvious from the description, or may be learned through practice of the technology.

In accordance with one embodiment, a vibrational damping assembly coupled to a turbomachine component is provided. The vibrational damping assembly includes at least one pin coupled to the turbomachine component. The at least one pin has a pin body and a disk coupled to the pin body. The vibrational damping assembly further includes at least one plate disposed between the disk and the turbomachine component. The at least one plate is movable between the disk and the turbomachine component relative to the plurality of pins and relative to the turbomachine component to dampen vibrations experienced by the turbomachine component.

In accordance with another embodiment, a turbomachine airfoil is provided. The turbomachine airfoil includes a leading edge and a trailing edge. The turbomachine airfoil further includes a first side wall and a second side wall that extend between the leading edge and the trailing edge. The first side wall and the second side wall define an interior of the turbomachine airfoil. A vibrational damping assembly is disposed in the interior of the turbomachine airfoil and coupled to one or both of the first side wall or the second side wall. The vibrational damping assembly includes at least one pin coupled to the turbomachine airfoil. The at least one pin has a pin body and a disk coupled to the pin body. The vibrational damping assembly further includes at least one plate disposed between the disk and the turbomachine airfoil. The at least one plate is movable between the disk and the turbomachine airfoil relative to the plurality of pins and relative to the turbomachine airfoil to dampen vibrations experienced by the turbomachine airfoil.

In accordance with yet another embodiment, an exhaust diffuser is provided. The exhaust diffuser includes an inner shell and an outer shell radially spaced apart from the inner shell such that an exhaust flow passage is defined therebetween. The exhaust diffuser further includes one or more struts disposed within the exhaust flow passage and extending between the inner shell and the outer shell. An auxiliary airfoil is coupled to each strut of the one or more struts. The auxiliary airfoil includes a leading edge and a trailing edge. The auxiliary airfoil further includes a first side wall and a second side wall that extend between the leading edge and the trailing edge. The first side wall and the second side wall define an interior of the auxiliary airfoil. A vibrational damping assembly is disposed in the interior of the auxiliary airfoil and coupled to one of the first side wall or the second side wall. The vibrational damping assembly includes at least one pin coupled to the auxiliary airfoil. The at least one pin has a pin body and a disk coupled to the pin body. The vibrational damping assembly further includes at least one plate disposed between the disk and the auxiliary airfoil. The at least one plate is movable between the disk and the auxiliary airfoil relative to the plurality of pins and relative to the auxiliary airfoil to dampen vibrations experienced by the auxiliary airfoil.

These and other features, aspects and advantages of the present vibrational damping assemblies, turbomachine airfoils, and exhaust diffusers will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present vibrational damping assemblies, turbomachine airfoils, and exhaust diffusers, including the best mode of making and using the present systems and methods, directed to one of ordinary skill in the art, is set forth in the specification, which makes reference to the appended figures, in which.

DETAILED DESCRIPTION

Figure 1:
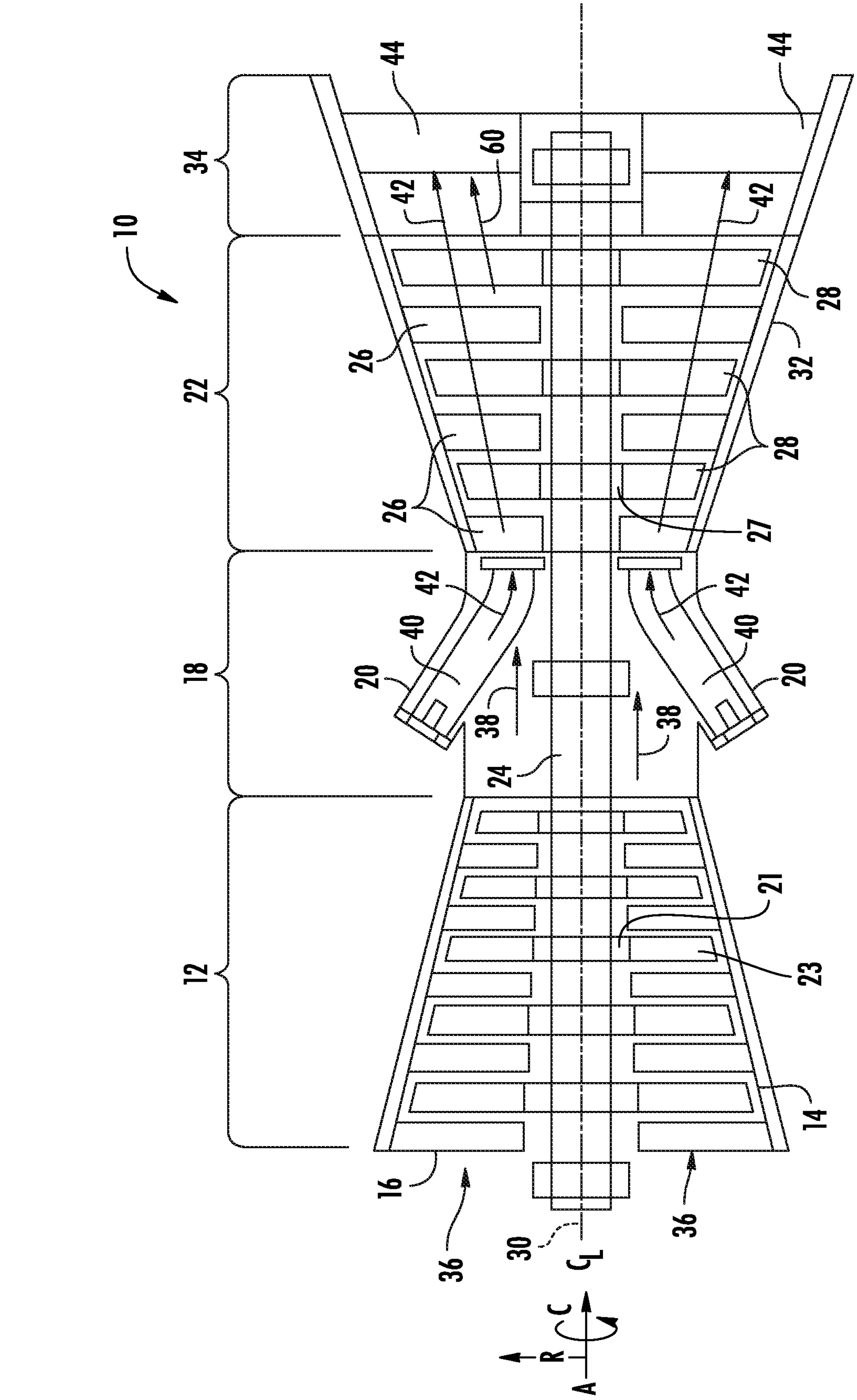
FIG. 1 is a schematic illustration of a turbomachine in accordance with embodiments of the present disclosure.

Reference now will be made in detail to embodiments of the present vibrational damping assemblies, turbomachine airfoils, and exhaust diffusers, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

The term "fluid" may be a gas or a liquid. The term "fluid communication" means that a fluid is capable of making the connection between the areas specified.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. However, the terms "upstream" and "downstream" as used herein may also refer to a flow of electricity. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component.

Terms of approximation, such as "about," "approximately," "generally," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. When used in the context of an angle or direction, such terms include within ten degrees greater or less than the stated angle or direction. For example, "generally vertical" includes directions within ten degrees of vertical in any direction, e.g., clockwise or counter-clockwise.

The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, FIG. 1 illustrates a schematic diagram of one embodiment of a turbomachine, which in the illustrated embodiment is a gas turbine 10. Although an industrial or land-based gas turbine is shown and described herein, the present disclosure is not limited to a land-based and/or industrial gas turbine unless otherwise specified in the claims. For example, the invention as described herein may be used in any type of turbomachine including but not limited to a steam turbine, an aircraft gas turbine, or a marine gas turbine.

As shown, the gas turbine 10 generally includes a compressor section 12. The compressor section 12 includes a compressor 14. The compressor includes an inlet 16 that is disposed at an upstream end of the gas turbine 10. The gas turbine 10 further includes a combustion section 18 having one or more combustors 20 disposed downstream from the compressor section 12. The gas turbine further includes a turbine section 22 that is downstream from the combustion section 18. A shaft 24 extends generally axially through the gas turbine 10.

The compressor section 12 may generally include a plurality of rotor disks 21 and a plurality of rotor blades 23 extending radially outwardly from and connected to each rotor disk 21. Each rotor disk 21 in turn may be coupled to or form a portion of the shaft 24 that extends through the compressor section 12. The rotor blades 23 of the compressor section 12 may include turbomachine airfoils that define an airfoil shape (e.g., having a leading edge, a trailing edge, and side walls extending between the leading edge and the trailing edge).

The turbine section 22 may generally include a plurality of rotor disks 27 and a plurality of rotor blades 28 extending radially outwardly from and being interconnected to each rotor disk 27. Each rotor disk 27 in turn may be coupled to or form a portion of the shaft 24 that extends through the turbine section 22. The turbine section 22 further includes an outer casing 32 that circumferentially surrounds the portion of the shaft 24 and the rotor blades 28. The turbine section 22 may include stationary nozzles 26 extending radially inward from the outer casing 32. The rotor blades 28 and stationary nozzles 26 may be arranged in alternating stages along an axial centerline 30 of gas turbine 10. Both the rotor blades 28 and the stationary nozzles 26 may include turbomachine airfoils that define an airfoil shape (e.g., having a leading edge, a trailing edge, and side walls extending between the leading edge and the trailing edge).

In operation, ambient air 36 or other working fluid is drawn into the inlet 16 of the compressor 14 and is progressively compressed to provide a compressed air 38 to the combustion section 18. The compressed air 38 flows into the combustion section 18 and is mixed with fuel to form a combustible mixture. The combustible mixture is burned within a combustion chamber 40 of the combustor 20, thereby generating combustion gases 42 that flow from the combustion chamber 40 into the turbine section 22. Energy (kinetic and/or thermal) is transferred from the combustion gases 42 to the rotor blades 28, causing the shaft 24 to rotate and produce mechanical work.

The gas turbine 10 may define a cylindrical coordinate system having an axial direction A extending along the axial centerline 30, a radial direction R perpendicular to the axial centerline 30, and a circumferential direction C extending around the axial centerline 30.

The combustion gases 42 exit the turbine section 22 and flow through the exhaust diffuser 34 across a plurality of struts or main airfoils 44 that are disposed within the exhaust diffuser 34. During various operating conditions of the gas turbine 10, such as during part-load operation, the combustion gases 42 flowing into the exhaust diffuser 34 from the turbine section 22 has a high level of swirl that is caused by the rotating turbine rotor blades 28. Such swirling flow can cause pressure fluctuations, frequency oscillations, or acoustic vibrations.

Figure 2:
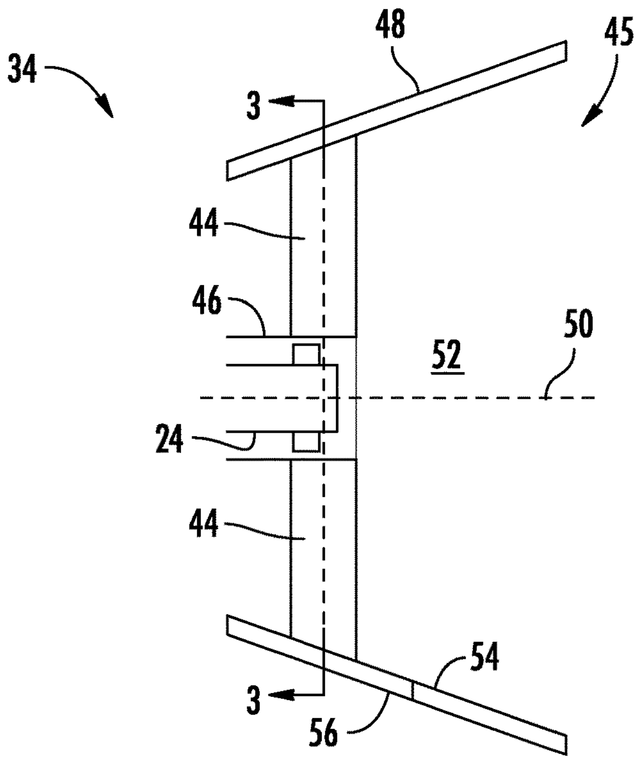
FIG. 2 illustrates an enlarged cross-sectional view of an exhaust diffuser in accordance with embodiments of the present disclosure.
Figure 3:
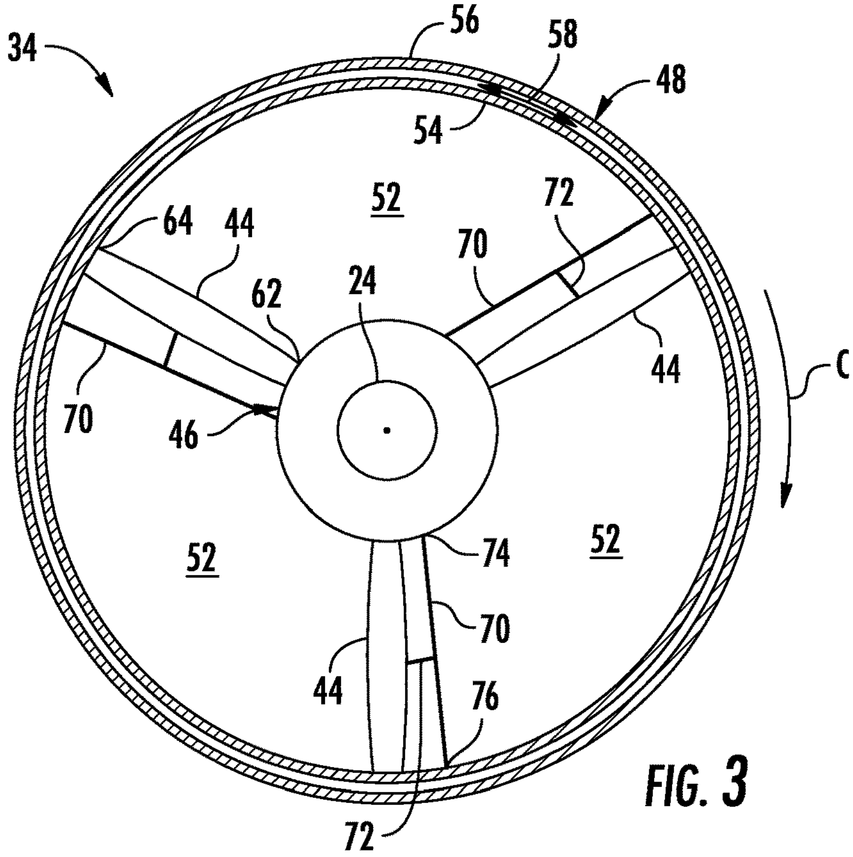
FIG. 3 illustrates a cross-sectional view of the exhaust diffuser from along the line 3-3 shown in FIG. 2, in accordance with embodiments of the present disclosure in accordance with embodiments of the present disclosure.

FIG. 2 illustrates a cross-sectional view of an exhaust diffuser 34, and FIG. 3 illustrates a cross-sectional view of the exhaust diffuser 34 from along the line 3-3 shown in FIG. 2, in accordance with embodiments of the present disclosure. As shown, the exhaust diffuser 34 generally includes an inner shell 46 and an outer shell 48. The inner shell 46 may extend generally axially along an axial centerline 50 of the exhaust diffuser 34. The axial centerline 50 of the exhaust diffuser 34 may be coaxial with the axial centerline 30 of the gas turbine 10. The inner shell 46 is generally annular shaped and may at least partially surround rotating components. For example, the inner shell 46 may surround or encase a portion of the shaft 24.

In many embodiments, the outer shell 48 may be radially separated from the inner shell 46, such that an exhaust flow passage 52 is defined between the inner shell 46 and the outer shell 48. In particular embodiments, the inner shell 46 is concentrically and coaxially aligned within the outer shell 48 with respect to the axial centerline 50. In certain embodiments, the outer shell 48 may have a double walled construction, with an inner casing 54 that is radially separated from an outer casing 56. A compressed working fluid plenum 58 may be defined between within the outer casing 56. For example, the compressed working fluid plenum 58 may be at least partially defined between the inner casing 54 and the outer casing 56. In other embodiments, the compressed working fluid plenum 58 may be defined within the inner casing 54. The present disclosure is not limited to any particular size, shape, material, or other physical characteristics of the inner shell 46, the outer shell 48 and/or the inner or outer casings 54, 56, except as recited in the claims.

Each of the diffuser struts 44 may extend between the inner shell 46 and the outer shell 48 and within the exhaust flow passage 52 defined therebetween. The diffuser struts 44 are spaced circumferentially around the inner shell 46, and the diffuser struts 44 may orient, align, or otherwise center inner shell 46 within the outer shell 48. In addition, the diffuser struts 44 may provide structural support between the inner and the outer shells 46, 48. As shown in FIG. 1, the diffuser struts 44 are positioned relative to a direction of flow 60 of the combustion gases 42 flowing from the turbine section 22 of the gas turbine 10. As shown in FIG. 3, each diffuser strut 44 generally includes a root portion 62 that is connected to the inner shell 46, and a tip portion 64 radially separated from the root portion 62. The tip portion 64 may be connected to the outer shell 48 and/or to the inner casing 54.

In many embodiments, as shown in FIG. 3, the exhaust diffuser 34 may further include a plurality of auxiliary airfoils 70. Each auxiliary airfoil 70 may be coupled to a respective strut 44 of the plurality of struts 44 via an x-plate 72. For example, each auxiliary airfoil 70 may be circumferentially spaced apart from the respective strut 44 to which it is attached, and the x-plate 72 may extend between the auxiliary airfoil 70 and the strut 44. Each auxiliary airfoil 70 may include a root 74 that is connected to the inner shell 46, and a tip 76 radially separated from the root portion 62. The tip 76 may be connected to the outer shell 48 and/or to the inner casing 54.

Figure 4:
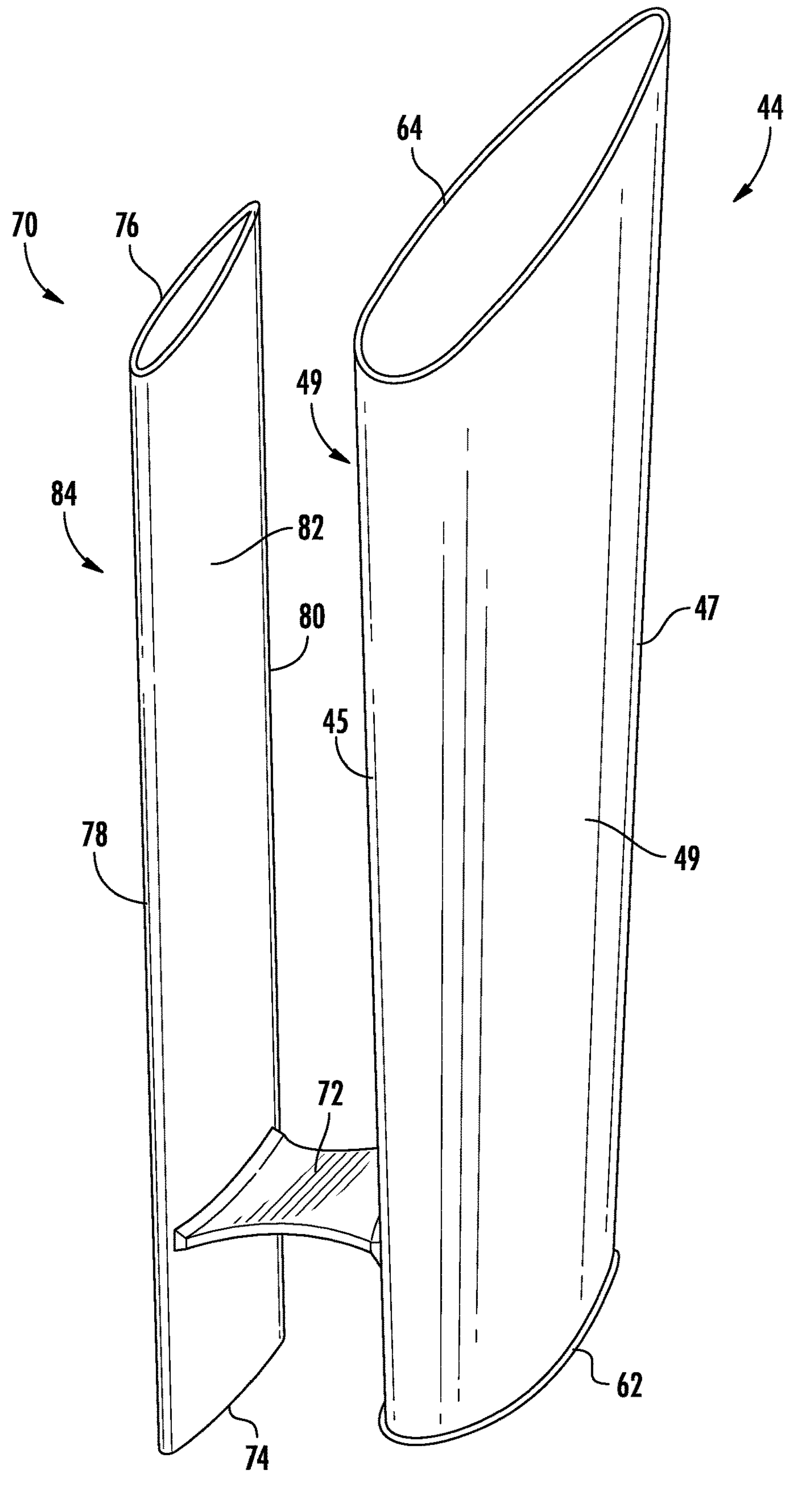
FIG. 4 illustrates a perspective view of a strut having an auxiliary airfoil in accordance with embodiments of the present disclosure.

FIG. 4 illustrates a perspective view of a strut 44 having an auxiliary airfoil 70 coupled thereto via an x-plate 72, in accordance with embodiments of the present disclosure. As shown, the x-plate 72 may be disposed closer to the root 74 of the auxiliary airfoil 70 than the tip 76. Stated otherwise, the x-plate 72 may be disposed closer to the root portion 62 of the strut 44 than the tip portion 64. As shown in FIG. 4, the strut 44 may generally define an airfoil shape. For example, the strut may include a leading edge 45, a trailing edge 47, and side walls 49 extending between the leading edge 45 and the trailing edge 47. Similarly, the auxiliary airfoil 70 may include a leading edge 78, a trailing edge 80, a first side wall 82 and a second side wall 84. The first side wall 82 and the second side wall 84 wall may each extend between the leading edge 78 and the trailing edge 80 of the auxiliary airfoil 70.

Figure 5:
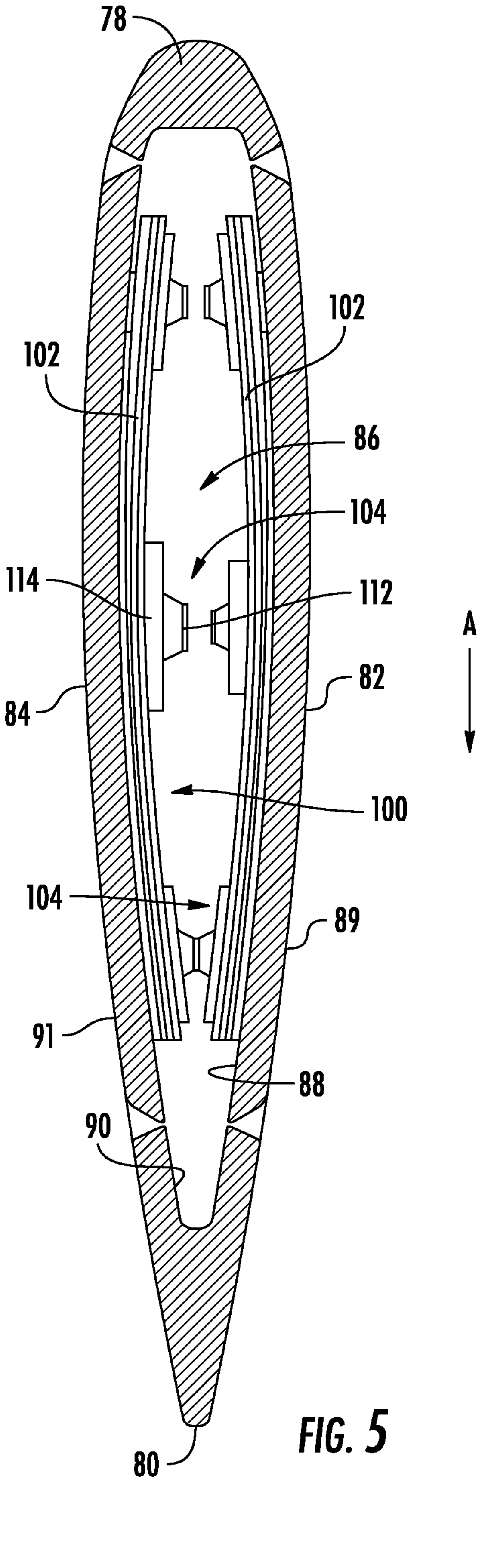
FIG. 5 illustrates a cross-sectional view of an auxiliary airfoil in accordance with embodiments of the present disclosure.

FIG. 5 illustrates a cross-sectional view of an auxiliary airfoil 70 from along the radial direction, in accordance with embodiments of the present disclosure. As shown, the first side wall 82 and the second side wall 84 may define an interior 86 of the auxiliary airfoil 70. Particularly, the interior 86 may be defined collectively by the leading edge 78, the first side wall 82, the trailing edge 80, and the second side wall 84. In many embodiments, the first side wall 82 may define a first interior surface 88 and a first exterior surface 89, and the second side wall 84 may define a second interior surface 90 and a second exterior surface 91. The first and second exterior surfaces 89 and 91 may define an airfoil shape and may be exposed to the exhaust gases traveling through the exhaust diffuser. The first and second interior surfaces 88 and 90 may define the interior 86 of the auxiliary airfoil 70, which is not exposed to exhaust gases.

In exemplary embodiments, a vibrational damping assembly 100 may be disposed within the interior 86 of the auxiliary airfoil 70. For example, the vibrational damping assembly 100 may be coupled (or affixed) to one of the first side wall 82 and/or the second side wall 84. Particularly, both the first side wall 82 and the second side wall 84 may include a vibrational damping assembly 100 coupled thereto, in order to reduce vibrations experienced by the auxiliary airfoil 70. In many embodiments, as shown, a first vibrational damping assembly 100 may be coupled to the interior surface 88 of the first side wall 82, and a second vibrational damping assembly 100 may be coupled to the interior surface 90 of the second side wall 84.

While FIG. 5 illustrates an auxiliary airfoil 70 having a vibrational damping assembly 100 affixed thereto, it should be appreciated that the vibrational damping assembly 100 may be coupled to any component of the gas turbine 10 (i.e., "turbomachine component") to dampen vibrations experienced by said component. In certain embodiments, the vibrational damping assembly 100 may be coupled to a turbomachine airfoil, such as an airfoil in the compressor section 12 (e.g., an airfoil of the compressor rotor blades and/or the stator vanes), or such as an airfoil in the turbine section (e.g., an airfoil of the turbine rotor blades and/or turbine nozzles). However, in exemplary embodiments, as shown in FIG. 4, the vibrational damping assembly 100 may be coupled to an auxiliary airfoil 70 disposed in the exhaust diffuser 34, in order to dampen vibrations experienced by the exhaust diffuser 34, the struts 44, and/or the auxiliary airfoil 70.

Figure 6:
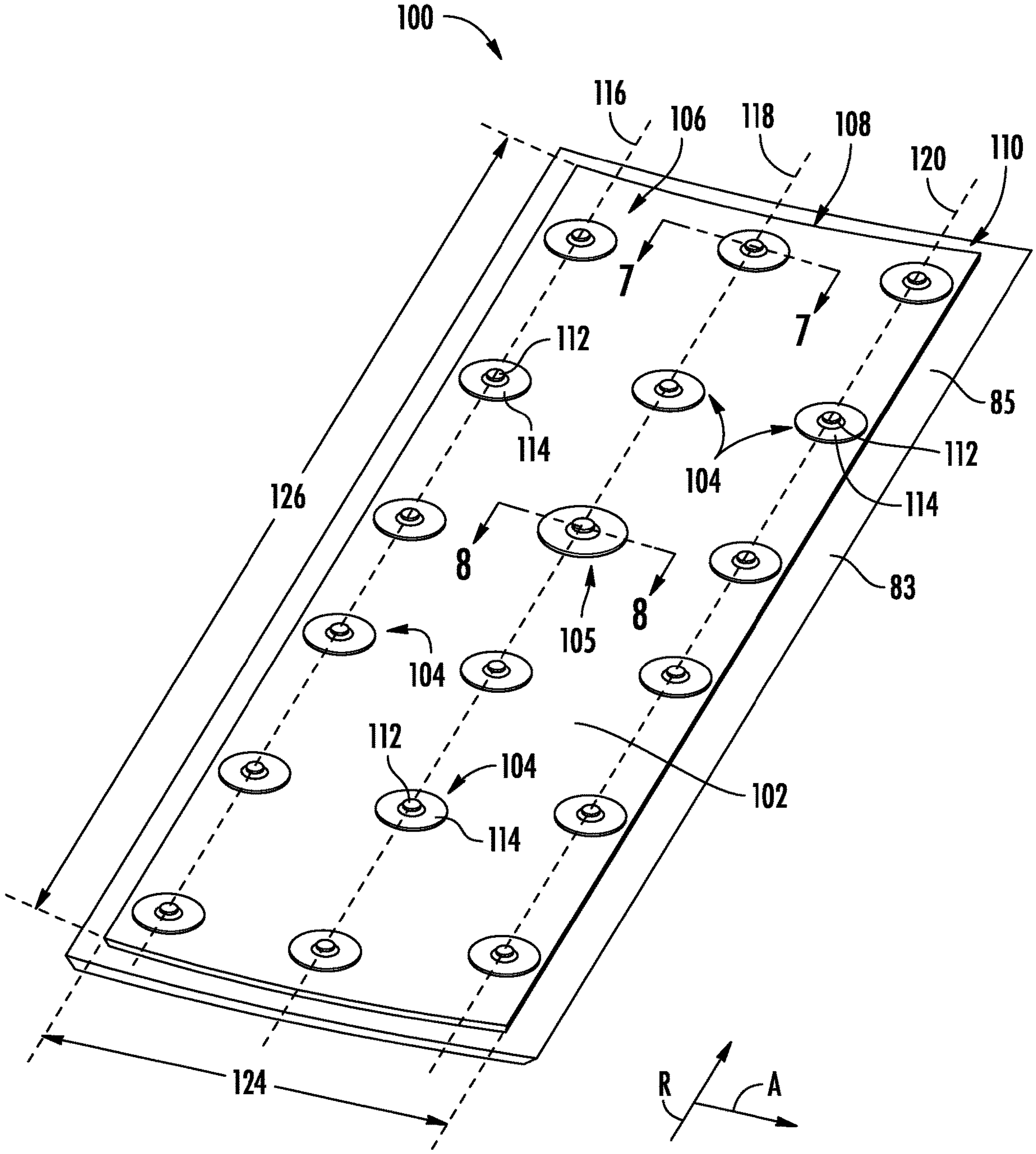
FIG. 6 illustrates a perspective view of a side wall of an auxiliary airfoil in accordance with embodiments of the present disclosure.

FIG. 6 illustrates a side wall 83 of an auxiliary airfoil 70 having a vibrational damping assembly coupled thereto, in accordance with embodiments of the present disclosure. For example, the side wall 83 shown in FIG. 6 may be representative of one of the first side wall 82 and/or the second side wall 84 of the auxiliary airfoil 70. As shown, the vibrational damping assembly 100 may include at least one plate 102 and at least one pin 104 extending through the at least one plate 102. For example, the at least one plate 102 may surround the at least one pin 104. Particularly, the vibrational damping assembly 100 may include a plurality of pins 104 coupled to the side wall 83 and each extending through the at least one plate 102. In various embodiments, the at least one plate 102 may be composed of metal or other suitable materials.

In many embodiments, the pin 104 may include a pin body 112 and a disk 114 coupled to the pin body 112 (e.g., fixedly coupled via welding or other means). The pin body 112 may be generally cylindrically shaped and attached (i.e., fixedly coupled via welding or other means) to the side wall 83. The pin body 112 of each pin 104 may extend through the at least one plate 102. Particularly, the at least one plate 102 may define a plurality of apertures 122 (FIGS. 7 and 8), and the pin body 112 of each pin 104 in the plurality of pins may extend through a respective aperture 122 of the plurality of apertures 122. Particularly, the at least one plate 102 may be disposed between the disk 114 of the pin 104 and the side wall 83, and the at least one plate 102 may be movable relative to the side wall 83 and relative to the at least one pin 104 to dampen vibrations experienced by the auxiliary airfoil 70. For example, as will be explained below in more detail, the at least one plate 102 may be constricted to movement along a longitudinal axis of the pin body 112 of the pin 104 between the disk 114 and the side wall 83. In this way, the at least one plate 102 may be decoupled from the side wall 83 and the at least one pin 104, and the at least one plate may be disposed between the side wall 83 and the disk 114 of the at least one pin 104 (such that the at least one plate 102 is movable between the side wall 83 and the disk 114).

As shown in FIG. 6, the at least one pin 104 may be a plurality of pins 104 arranged in an array. Each pin 104 may be spaced apart (both axially and radially) from neighboring pins 104 in the plurality of pins 104. For example, the plurality of pins 104 may include a first radial row 106, a second radial row 108, and a third radial row 110. The second radial row 108 may be disposed between the first radial row 106 and the third radial row 110. Each pin 104 in the first radial row 106 of pins 104 may intersect a first radial axis 116, each pin 104 in the second radial row 108 of pins 104 may intersect a second radial axis 118, and each pin 104 in the third radial row 110 of pins 104 may intersect a third radial axis 120. The first, second, and third radial axes 116, 118, and 120 may each be axially spaced apart from one another.

In some embodiments, as shown in FIG. 6, the plurality of pins 104 may include at least one positioning pin 105. As will be explained below in further detail, the positioning pin 105 may ensure the at least one plate 102 does not shift radially or axially, such that the at least one plate 102 is constrained to movement in a direction parallel to a longitudinal axis of the pin body 112 between the disk 114 and the side wall 83. The positioning pin 105 may be disposed towards the center of the plate 102 and towards the center of the side wall 83. For example, the positioning pin 105 may be disposed in the second radial row 108.

Figure 7:
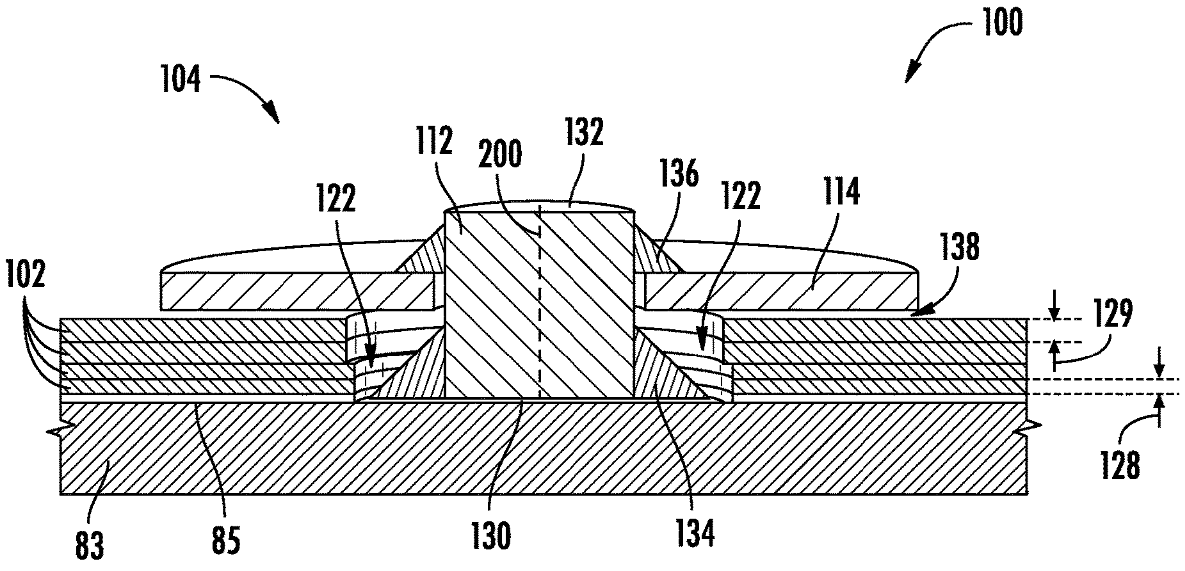
FIG. 7 illustrates a cross sectional view of the side wall of the auxiliary airfoil from along the line 7-7 shown in FIG. 6 in accordance with embodiments of the present disclosure.
Figure 8:
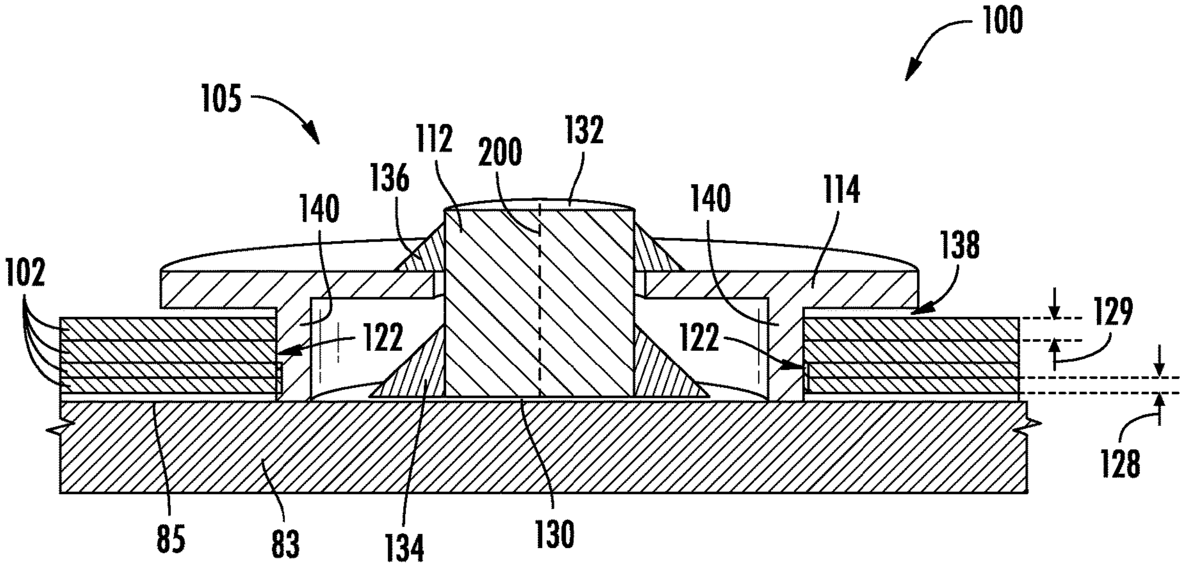
FIG. 8 illustrates a cross sectional view of the side wall of the auxiliary airfoil from along the line 8-8 shown in FIG. 6 in accordance with embodiments of the present disclosure.

As shown in FIG. 6, the at least one plate 102 may define a width 124, a length 126, and a thickness 128, 129 (FIGS. 7 and 8). The length 126 may longer than the width 124 and the thickness 128, 129 (i.e., the length 126 is the longest dimension of the plate 102). The thickness 128, 129 may be smaller than the length 126 and the width 124 (i.e., the thickness 128, 129 is the smallest dimension of the plate 102). A surface area of the plate 102 may be calculated by multiplying the width 124 by the length 126. In exemplary embodiments, the least one plate 102 is thin walled such that the at least one plate 102 defines a ratio between a thickness 128, 129 of the at least one plate 102 and a width 124 of the at least one plate 102 of between about 1:100 and about 1:5000, or such as between about 1:500 and about 1:4500, or such as between about 1:1000 and about 1:4000, or such as between about 1:1500 and about 1:3500, or such as between about 1:2000 and about 1:3000. In some embodiments, the at least one plate 102 may be thin walled such that the at least one plate 102 defines a ratio between surface area and thickness 128, 129 of between about 20000 millimeters (mm) and about 10000000 mm, or such as between about 30000 mm and about 9000000 mm, or such as between about 40000 mm and about 8000000 mm, or such as between about 50000 mm and about 5000000 mm, Or such as between about 100000 mm and 1000000 mm. In many embodiments, the surface area of the at least one plate 102 may be between about 0.02 $m^2$ and about 2 $m^2$, or such as between about 0.12 $m^2$ and about 1.9 $m^2$, or such as between about 0.22 $m^2$ and about 1.8 $m^2$, or such as between about 0.32 $m^2$ and about 1.7 $m^2$, or such as between about 0.42 $m^2$ and about 1.6 $m^2$, or such as between about 0.52 $m^2$ and about 1.5 $m^2$, or such as between about 0.82 $m^2$ and about 1.2 $m^2$. In various embodiments, as shown in FIG. 6, the at least one plate may be sized to correspond with the side wall 83. For example, the surface area of the at least one plate 102 may be within about 30% of a surface area of an interior surface of the side wall 83, or such as within about 20% of a surface area of an interior surface of the side wall 83, or such as within about 15% of a surface area of an interior surface of the side wall 83, or such as within about 10% of a surface area of an interior surface of the side wall 83, or such as within about 5% of a surface area of an interior surface of the side wall 83.

FIG. 7 illustrates a cross sectional view of the side wall 83 of the auxiliary airfoil 70 from along the line 7-7 shown in FIG. 6, which shows details of a pin 104, in accordance with embodiments of the present disclosure. As shown, the pin 104 includes a pin body 112 coupled to an interior surface 85 of the side wall 83. For example, the pin body 112 may extend along a longitudinal centerline 200 from a base 130 coupled to the interior surface 85 of the side wall 83 to a tip 132. The pin body 112 may be generally cylindrically shaped, and the pin body 112 may terminate at the tip 132. The base 130 of the pin body 112 may be fixedly coupled to the interior surface 85 of the side wall 83 via welding, such that a weld seam or fillet 134 is defined annularly around the base 130 of the pin body 112, thereby joining the pin body 112 to the side wall 83. The weld seam or fillet 134 may have a generally wedge shape (or triangularly shaped) cross section that annularly surrounds the pin body 112.

The pin 104 may further include a disk 114 that annularly surrounds the pin body 112. The disk 114 may be coupled to the pin body 112 between the base 130 and the tip 132. Particularly, the disk 114 may be disposed closer to the tip 132 than the base 130. In various embodiments, the disk 114 may be fixedly coupled to the pin body 112 via welding, such that a weld seam or fillet 136 is defined annularly around the pin body 112, thereby joining the pin body 112 to the disk 114. The weld seam or fillet 136 may have a generally wedge shape (or triangularly shaped) cross section that annularly surrounds the pin body 112.

In exemplary embodiments, as shown in FIG. 7, the at least one plate 102 may be a plurality of plates 102 disposed between the disk 102 and the interior surface 85 of the side wall 83. While FIGS. 7 and 8 illustrate an embodiment having four plates 102, it should be appreciated that the vibrational damping assembly 100 may include any number of plates 102 and should not be limited to any particular number of plates unless specifically recited in the claims. The plurality of plates 102 may include an inner plate, a first middle plate, a second middle plate, and an outer plate. The inner plate may be disposed between the inner surface 85 and the first middle plate. The first middle plate may be disposed between the inner plate and the second middle plate. The second middle plate may be disposed between the first middle plate and the outer plate. The outer plate may be disposed between the second middle plate and the disk 114.

As shown in FIG. 7, each plate 102 of the plurality of plates 102 may define an aperture 122, which may be concentric and aligned with one another, such that a passage is defined collectively by the apertures 122 of each plate 102. The pin body 112 may extend through each aperture 122 (thereby extending through the passage). A diameter of the disk 114 may be larger than a diameter of the aperture 122, such that the plates 102 do not fall off of the pin bodies 112 during operation. Similarly, a diameter of the pin body 112 may be smaller than the diameter of the aperture 122, such that the pin body 112 may extend through the apertures 122.

In exemplary embodiments, the plurality of plates 102 may include a first plate having a first thickness 128 and a second plate having a second thickness 129, the second thickness 129 may be greater than the first thickness 128. For example, the second thickness 129 may be between about 20% and about 80% greater than the first thickness 128, or such as between about 30% and about 70% greater than the first thickness 128, or such as between about 40% and about 60% greater than the first thickness 128. As shown, in some embodiments, the inner plate and the first middle plate may define the first thickness 128. The second middle plate and the outer plate may define the second thickness 129.

In exemplary embodiments, each plate 102 in the plurality of plates 102 may be movable between the disk 114 and the interior surface 85 of the side wall 83 relative to the pin body 112, the disk 114, the side wall 83, and relative to other plates in the plurality of plates 102 to dampen vibrations experienced by the auxiliary airfoil 70. For example, each plate 102 of the plurality of plates 102 may be constrained to movement in a direction parallel to a longitudinal axis of the pin body 112 between the disk 114 and the side wall 83. In various embodiments, a gap 138 may be defined between the disk 114 and the plurality of plates 102, such that the plurality of plates 102 are movable across the gap 138. For example, the gap 138 may be defined between the disk 114 and a first plate of the plurality of plates 102 closest to the disk 114 such that the first plate is movable across the gap 138. Particularly, a first distance may be defined between the disk 114 and the interior surface 85 of the side wall 83, and a second distance may be defined by the sum of the thicknesses of the plurality of plates 102, and the second distance may be shorter than the first distance. In this way, the plurality of plates 102 may move in a direction parallel to the longitudinal centerline 200 of the pin body 112 between the disk 114 and the side wall 83 to dampen vibrations of the auxiliary airfoil 70.

FIG. 8 illustrates a cross sectional view of the side wall of the auxiliary airfoil from along the line 8-8 shown in FIG. 6, which shows details of the positioning pin 105, in accordance with embodiments of the present disclosure. As shown, the positioning pin 105 may include an annular wall 140 extending between the disk 114 of the positioning pin 105 and the interior surface 85 of the side wall 83. The annular wall 140 may extend from the disk 114 to the interior surface 85 of the side wall 83, such that the annular wall 140 contacts the interior surface 85. The annular wall 140 may be integrally formed (or unitary having a singular body) with the disk 114. Alternatively or additionally, the annular wall 140 may be fixedly coupled (such as welded) to the disk 114. The at least one plate 102 may contact the annular wall 140 of the positioning pin 105. For example, the diameter of the apertures 122 may be within about 5% of the diameter of the annular wall 140, such that the boundary defining the apertures 122 is in sliding contact with the exterior of the annular wall 140. In this way, the annular wall 140 may constrain the plurality of plates 102 to movement in a direction parallel to the to the longitudinal centerline 200 of the pin body 112.

During operation, the plates 102 may move relative to one another, and relative to the side wall 83 and disk 114, which causes micro-collisions (or "bumping") between the plates 102. These micro-collisions may counteract vibrations experienced by the component to which the vibrational damping assembly 100 is attached, thereby advantageously increasing the hardware life of the component.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A vibrational damping assembly affixed to a turbomachine component, the vibrational damping assembly comprising: at least one pin coupled to the turbomachine component, the at least one pin having a pin body and a disk coupled to the pin body; and at least one plate disposed between the disk and the turbomachine component, wherein the at least one plate surrounds the at least one pin, and wherein the at least one plate is movable between the disk and the turbomachine component relative to the at least one pin and relative to the turbomachine component to dampen vibrations experienced by the turbomachine component.

The vibrational damping assembly as in one or more of these clauses, wherein the at least one plate is thin walled such that the at least one plate defines a ratio between a thickness of the at least one plate and a width of the at least one plate of between about 1:100 and 1:5000.

The vibrational damping assembly as in one or more of these clauses, wherein the at least one plate comprises a plurality of plates disposed between the disk and the turbomachine component.

The vibrational damping assembly as in one or more of these clauses, wherein the plurality of plates includes a first plate having a first thickness and a second plate having a second thickness, the second thickness being greater than the first thickness.

The vibrational damping assembly as in one or more of these clauses, wherein a gap is defined between the disk and a first plate of the plurality of plates closest to the disk such that the first plate is movable across the gap.

The vibrational damping assembly as in one or more of these clauses, wherein the at least one plate defines a plurality of apertures, and wherein each pin in the at least one pin extends through a respective aperture of the plurality of apertures.

The vibrational damping assembly as in one or more of these clauses, wherein the at least one pin comprises a plurality of pins arranged in an array on the turbomachine component.

The vibrational damping assembly as in one or more of these clauses, wherein the plurality of pins includes at least one positioning pin.

The vibrational damping assembly as in one or more of these clauses, wherein the positioning pin includes an annular wall extending between the disk of the positioning pin and the turbomachine component, and wherein the at least one plate contacts the annular wall of the positioning pin.

The vibrational damping assembly as in one or more of these clauses, wherein the turbomachine component is an airfoil having an interior surface that defines an interior of the airfoil, wherein the vibrational damping assembly is disposed within the interior of the airfoil and coupled to the interior surface.

A turbomachine airfoil comprising: a leading edge; a trailing edge; a first side wall and a second side wall extending between the leading edge and the trailing edge, the first side wall and the second side wall defining an interior of the turbomachine airfoil; and a vibrational damping assembly disposed in the interior of the turbomachine airfoil and coupled to one of the first side wall or the second side wall, the vibrational damping assembly comprising: at least one pin coupled to the turbomachine airfoil, the at least one pin having a pin body and a disk coupled to the pin body; and at least one plate disposed between the disk and the turbomachine airfoil, wherein the at least one plate is movable between the disk and the turbomachine airfoil relative to the at least one pin and relative to the turbomachine airfoil to dampen vibrations experienced by the turbomachine airfoil.

The turbomachine airfoil as in one or more of these clauses, wherein the at least one plate is thin walled such that the at least one plate defines a ratio between a thickness of the at least one plate and a width of the at least one plate of between about 1:100 and 1:5000.

The turbomachine airfoil as in one or more of these clauses, wherein the at least one plate comprises a plurality of plates disposed between the disk and the turbomachine component.

The turbomachine airfoil as in one or more of these clauses, wherein the plurality of plates includes a first plate having a first thickness and a second plate having a second thickness, the second thickness being greater than the first thickness.

The turbomachine airfoil as in one or more of these clauses, wherein a gap is defined between the disk and a first plate of the plurality of plates closest to the disk such that the first plate is movable across the gap.

The turbomachine airfoil as in one or more of these clauses, wherein the at least one plate defines a plurality of apertures, and wherein each pin in the at least one pin extends through a respective aperture of the plurality of apertures.

The turbomachine airfoil as in one or more of these clauses, wherein the at least one pin comprises a plurality of pins arranged in an array on the turbomachine component.

The turbomachine airfoil as in one or more of these clauses, wherein the plurality of pins includes at least one positioning pin, wherein the positioning pin includes an annular wall extending between the disk of the positioning pin and the turbomachine component, and wherein the at least one plate contacts the annular wall of the positioning pin.

The turbomachine airfoil as in one or more of these clauses, wherein the turbomachine airfoil is an auxiliary an auxiliary airfoil coupled to a strut disposed within an exhaust flow passage of an exhaust diffuser of a turbomachine.

An exhaust diffuser comprising: an inner shell; an outer shell radially spaced apart from the inner shell such that an exhaust flow passage is defined therebetween; one or more struts disposed within the exhaust flow passage and extending between the inner shell and the outer shell; and an auxiliary airfoil coupled to each strut of the one or more struts, the auxiliary airfoil comprising: a leading edge; a trailing edge; a first side wall and a second side wall extending between the leading edge and the trailing edge, the first side wall and the second side wall defining an interior of the auxiliary airfoil; and a vibrational damping assembly disposed in the interior of the auxiliary airfoil and coupled to one of the first side wall or the second side wall, the vibrational damping assembly comprising: at least one pin coupled to the auxiliary airfoil, the at least one pin having a pin body and a disk coupled to the pin body; and at least one plate disposed between the disk and the auxiliary airfoil, wherein the at least one plate is movable between the disk and the auxiliary airfoil relative to the at least one pin and relative to the auxiliary airfoil to dampen vibrations experienced by the auxiliary airfoil.

What is claimed is:

1. A vibrational damping assembly affixed to a turbomachine component, the vibrational damping assembly comprising:

at least one pin having a pin body and a disk coupled to the pin body, wherein the pin body extends from a base welded to a surface of the turbomachine component; and at least one plate disposed between the disk and the turbomachine component, wherein the at least one plate surrounds the at least one pin, and wherein the at least one plate is movable between the disk and the turbomachine component relative to the at least one pin and relative to the turbomachine component to dampen vibrations experienced by the turbomachine component.

2. The vibrational damping assembly as in claim 1, wherein the at least one plate is thin walled such that the at least one plate defines a ratio between a thickness of the at least one plate and a width of the at least one plate of between 1:100 and 1:5000.

3. The vibrational damping assembly as in claim 1, wherein the at least one plate comprises a plurality of plates disposed between the disk and the turbomachine component.

4. The vibrational damping assembly as in claim 3, wherein the plurality of plates includes a first plate having a first thickness and a second plate having a second thickness, the second thickness being greater than the first thickness.

5. The vibrational damping assembly as in claim 3, wherein a gap is defined between the disk and a first plate of the plurality of plates closest to the disk such that the first plate is movable across the gap.

6. The vibrational damping assembly as in claim 1, wherein the at least one plate defines a plurality of apertures, and wherein each pin in the at least one pin extends through a respective aperture of the plurality of apertures.

7. The vibrational damping assembly as in claim 6, wherein the at least one pin comprises a plurality of pins arranged in an array on the turbomachine component.

8. The vibrational damping assembly as in claim 7, wherein the plurality of pins includes at least one positioning pin.

9. The vibrational damping assembly as in claim 8, wherein the positioning pin includes an annular wall extending between the disk of the positioning pin and the turbomachine component, and wherein the at least one plate contacts the annular wall of the positioning pin.

10. The vibrational damping assembly as in claim 1, wherein a weld seam is defined annularly around the base of the pin body.

11. A vibrational damping assembly affixed to an interior surface of an airfoil, the vibrational damping assembly comprising:

at least one pin having a pin body and a disk coupled to the pin body, wherein the pin body extends from a base welded to the interior surface of the airfoil; and at least one plate disposed between the disk and the airfoil, wherein the at least one plate surrounds the at least one pin, and wherein the at least one plate is movable between the disk and the airfoil relative to the at least one pin and relative to the airfoil to dampen vibrations experienced by the airfoil.

12. The vibrational damping assembly as in claim 11, wherein the at least one plate is thin walled such that the at least one plate defines a ratio between a thickness of the at least one plate and a width of the at least one plate of between 1:100 and 1:5000.

13. The vibrational damping assembly as in claim 11, wherein the at least one plate comprises a plurality of plates disposed between the disk and the airfoil.

14. The vibrational damping assembly as in claim 13, wherein the plurality of plates includes a first plate having a first thickness and a second plate having a second thickness, the second thickness being greater than the first thickness.

15. The vibrational damping assembly as in claim 13, wherein a gap is defined between the disk and a first plate of the plurality of plates closest to the disk such that the first plate is movable across the gap.

16. The vibrational damping assembly as in claim 11, wherein the at least one plate defines a plurality of apertures, and wherein each pin in the at least one pin extends through a respective aperture of the plurality of apertures.

17. The vibrational damping assembly as in claim 16, wherein the at least one pin comprises a plurality of pins arranged in an array on the airfoil.

18. The vibrational damping assembly as in claim 17, wherein the plurality of pins includes at least one positioning pin.

19. The vibrational damping assembly as in claim 18, wherein the positioning pin includes an annular wall extending between the disk of the positioning pin and the airfoil, and wherein the at least one plate contacts the annular wall of the positioning pin.

* * * * *